(12) United States Patent
Mandal et al.

(10) Patent No.: US 10,476,661 B2
(45) Date of Patent: Nov. 12, 2019

(54) POLYNOMIAL-BASED HOMOMORPHIC ENCRYPTION

(71) Applicant: FUJITSU LIMITED, Kawasaki-shi, Kanagawa (JP)

(72) Inventors: Avradip Mandal, San Jose, CA (US); Arnab Roy, Santa Clara, CA (US); Hart Montgomery, Redwood City, CA (US)

(73) Assignee: FUJITSU LIMITED, Kawasaki (JP)

( * ) Notice: Subject to any disclaimer, the term of this patent is extended or adjusted under 35 U.S.C. 154(b) by 105 days.

(21) Appl. No.: 15/193,394

(22) Filed: Jun. 27, 2016

(65) Prior Publication Data

US 2017/0373834 A1 Dec. 28, 2017

(51) Int. Cl.
*G06F 21/00* (2013.01)
*H04L 29/06* (2006.01)
*H04L 9/00* (2006.01)
*H04L 9/08* (2006.01)

(52) U.S. Cl.
CPC ............ *H04L 9/008* (2013.01); *H04L 9/0869* (2013.01)

(58) Field of Classification Search
CPC .............................. H04L 9/008; H04L 9/0869
See application file for complete search history.

(56) References Cited

U.S. PATENT DOCUMENTS

| | | | |
|---|---|---|---|
| 4,633,470 A | 12/1986 | Welch et al. | |
| 5,008,938 A * | 4/1991 | Freeburg | H04L 9/065 380/265 |
| 5,046,036 A * | 9/1991 | Tezuka | G06F 7/584 708/253 |
| 8,627,107 B1 * | 1/2014 | Kennedy | G06F 21/62 380/28 |
| 9,252,954 B2 * | 2/2016 | Halevi | H04L 9/008 |
| 2002/0018561 A1 * | 2/2002 | Emelko | H04L 9/304 380/28 |
| 2003/0051129 A1 * | 3/2003 | Razdan | H04L 9/083 713/151 |
| 2007/0245154 A1 * | 10/2007 | Akkermans | G06K 9/00885 713/186 |

(Continued)

OTHER PUBLICATIONS

Marten van Dijk, Craig Gentry, Shai Halevi, and Vinod Vaikuntanathan. "Fully homomorphic encryption over the integers". Eurocrypt 2010, Jun. 8, 2010.

(Continued)

*Primary Examiner* — Lisa C Lewis
(74) *Attorney, Agent, or Firm* — Maschoff Brennan (57) ABSTRACT

A method includes generating a secret key for encryption and decoding data. The method includes identifying a set of data in plaintext format. The method further includes converting, by a processing device, the data in plaintext format to ciphertext using a polynomial. The method also includes sending the ciphertext to a remote device for data processing, wherein the remote device is to process the ciphertext without having the secret key. The method includes receiving processed ciphertext from the remote device. The method further includes decoding, by the processing device, the processed ciphertext based on the secret key and the polynomial to yield processed plaintext. The method also includes outputting the processed plaintext.

20 Claims, 7 Drawing Sheets

(56) References Cited

U.S. PATENT DOCUMENTS

| | | | | |
|---|---|---|---|---|
| 2008/0181398 | A1* | 7/2008 | Pappu | H04L 9/085 380/44 |
| 2009/0141898 | A1* | 6/2009 | Huang | H04L 9/0833 380/270 |
| 2013/0191647 | A1* | 7/2013 | Ferrara, Jr. | G06F 21/32 713/186 |
| 2013/0275743 | A1* | 10/2013 | Jawurek | H04L 9/008 713/150 |
| 2014/0314231 | A1* | 10/2014 | Gilbert | H04L 9/0869 380/46 |
| 2014/0325230 | A1* | 10/2014 | Sy | G06F 21/32 713/171 |
| 2015/0089586 | A1* | 3/2015 | Ballesteros | H04W 12/08 726/3 |
| 2015/0172258 | A1* | 6/2015 | Komano | H04L 9/0816 380/259 |
| 2017/0323114 | A1* | 11/2017 | Egorov | G06F 21/6218 |

OTHER PUBLICATIONS

Jean-Sebastien Coron, Avradip Mandal, David Naccache, and Mehdi Tibouchi. "Fully homomorphic encryption over the integers with shorter public keys", Crypto 2011, 2011.

Jean-Sebastien Coron, David Naccache, and Mehdi Tibouchi. "Public key compression and modulus switching for fully homomorphic encryption over the integers", Eurocrypt 2012, 2012.

Cheon, Jung Hee, Jean-Sébastien Coron, Jinsu Kim, Moon Sung Lee, Tancrède Lepoint, Mehdi Tibouchi, and Aaram Yun. "Batch fully homomorphic encryption over the integers", Eurocrypt 2013, May 26, 2013.

Jean-Sebastien Coron, David Naccache, and Mehdi Tibouchi. "Batch Fully Homomorphic Encryption over the Integers" Eurocrypt 2013, 2013.

Coron, Jean-Sébastien, Tancrède Lepoint, and Mehdi Tibouchi. "Scale-invariant fully homomorphic encryption over the integers" PKC 2014, 2014.

Craig Gentry. "Fully homomorphic encryption using ideal lattices," STOC 2009, 2009.

Craig Gentry and Shai Halevi. "Implementing Gentry's fully-homomorphic encryption scheme," Eurocrypt 2011, Feb. 4, 2011.

Zvika Brakerski and Vinod Vaikuntanathan. "Fully homomorphic encryption from Ring-LWE and security for key dependent messages," Crypto 2011, 2011.

Zvika Brakerski, Craig Gentry, and Vinod Vaikuntanathan. (Leveled) Fully homomorphic encryption without bootstrapping, ITCS 2012, 2012.

Zvika Brakerski. Fully homomorphic encryption without modulus switching from classical GapSVP, Crypto 2012, 2012.

Craig Gentry, Shai Halevi, and Nigel P. Smart. Homomorphic evaluation of the AES circuit, Crypto 2012, Jan. 3, 2015.

"Reed-Solomon error correction" https://en.wikipedia.org/wiki/Reed%E2%80%93Solomon_error_correction, accessed Jun. 24, 2016.

* cited by examiner

POLYNOMIAL-BASED HOMOMORPHIC ENCRYPTION

FIELD

The embodiments discussed herein are related to polynomial-based homomorphic encryption.

BACKGROUND

Homomorphic encryption (HE) is an encryption scheme which allows anyone to perform operations on underlying data without having a secret key. The results of such operations include encrypted data. A party possessing the secret key may decode and recover the results.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method includes generating a secret key for encryption and decoding data. The method includes identifying a set of data in plaintext format. The method further includes converting, by a processing device, the data in plaintext format to ciphertext using a polynomial. The method also includes sending the ciphertext to a remote device for data processing, wherein the remote device is to process the ciphertext without having the secret key. The method includes receiving processed ciphertext from the remote device. The method further includes decoding, by the processing device, the processed ciphertext based on the secret key and the polynomial to yield processed plaintext. The method also includes outputting the processed plaintext.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Homomorphic encryption (HE) is an encryption scheme which allows anyone to perform operations on underlying data without having a secret key. The results of such operations include encrypted data. A party possessing the secret key may decode and recover the results of the operations. HE may be useful is situations where operations may be performed on the underlying data, while keeping the underlying data private to a system that is performing the operations. For example, HE may be useful when outsourcing data operations to another entity, such as to a cloud. Some conventional approaches to HE may include encrypting the data using integer operations, lattice operations, or ring operations. Each of these approaches, however, include various drawbacks. For example, integer, lattice and ring-based HE schemes may be difficult to implement because of complexity of the algorithms or might not be efficient for practical computations.

Aspects of the present disclosure address these and other shortcomings of existing HE schemes by providing a HE scheme based on polynomial operations. Encrypted data may be decoded using Reed-Solomon decoding. The security of the disclosed HE scheme may be based on a hidden set of polynomial evaluation x-coordinates and a random addition of noise while encrypting the data. Polynomial based computations may be easier to implement and may be part of various standard computational libraries.

Some aspects of the present disclosure may use the polynomial-based HE with a voting system. In some voting systems, it may be beneficial to use a server to compute total votes for candidates or various ballot measures. At the same time, privacy of individual votes is desired. A polynomial-based HE scheme allows a server to compute such a vote total over encrypted data. A secret key holder may decode and recover the vote total.

In at least one embodiment, the polynomial-based HE may be used in a healthcare context. Healthcare data is typically private by nature, which may introduce an impediment to send private health data to a $3^{rd}$ party for specialized analytics and/or storage. With a polynomial-based HE scheme, a hospital may securely outsource such services to $3^{rd}$ parties, while improving protection of patient privacy.

Some aspects of the present disclosure may use a polynomial-based HE scheme with a privacy preserving web server. Some entities may provide web access to various software services, such as machine learning algorithms, with the objective of keeping the underlying software code secret, so that no one can reverse engineer the code. Further, end users may not want their sensitive data to go to the hands of such entities. A HE scheme enables such services, while improving protection of user data.

Some additional details of these and other embodiments are discussed with respect to the appended figures in which commonly labeled items indicate similar structures unless described otherwise. The drawings are diagrammatic and schematic representations of some embodiments, and are not meant to be limiting, nor are they necessarily drawn to scale. Throughout the drawings, like numbers generally reference like structures unless described otherwise.

Figure 1:
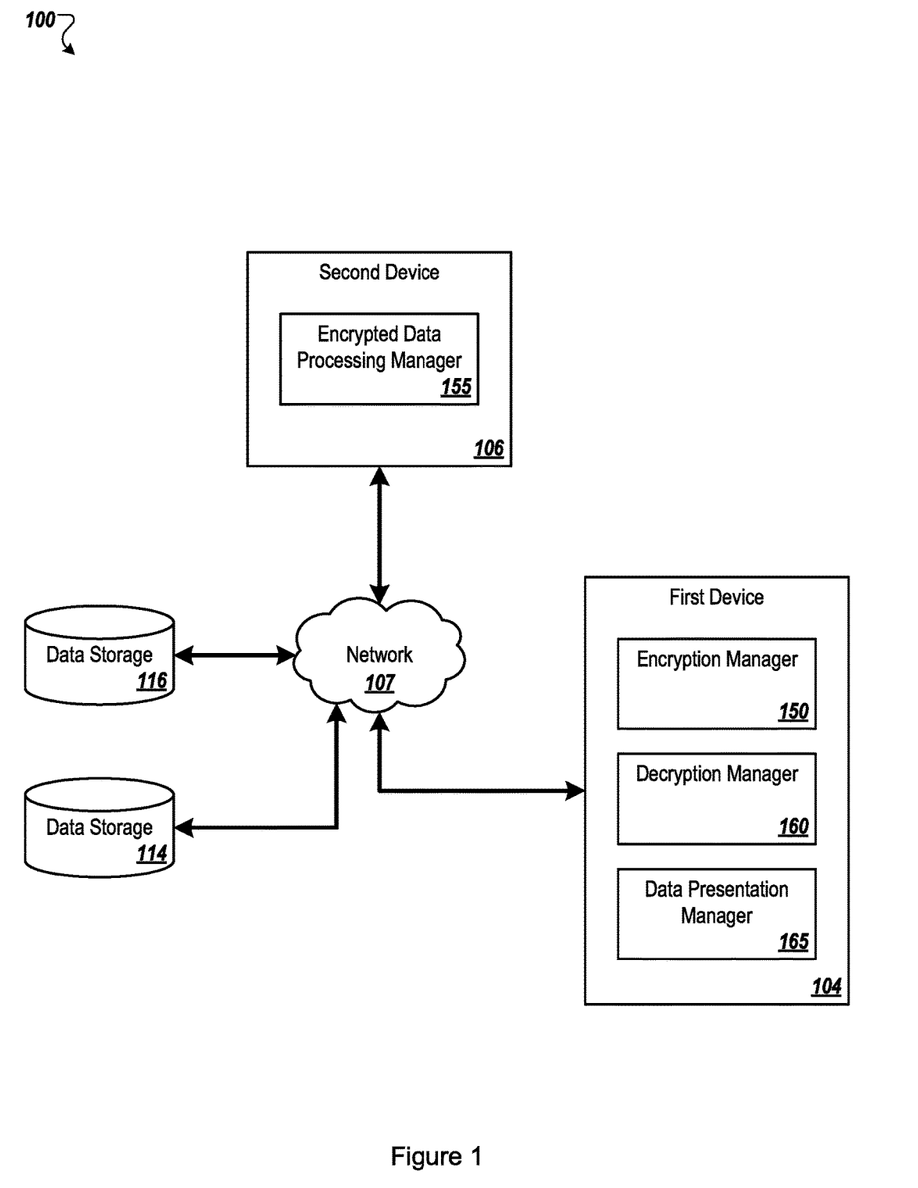
FIG. 1 illustrates a block diagram of an example operating environment.

FIG. 1 illustrates a block diagram of an example operating environment 100, arranged in accordance with at least one embodiment described herein. The operating environment 100 includes a first device 104, a second device 106, a data storage 114, a data storage 116, and a network 107. The first device 104, second device 106, the data storage 114, and the data storage 116 (collectively, "environment components") may be communicatively coupled via the network 107. The environment components may communicate data among each other via the network 107. Each of the environment components are briefly described in the following paragraphs.

The first device 104 may include a processor-based computing system. The first device 104 may include memory, a processor, and network communication capabilities. In the operating environment 100, the first device 104 may be capable of communicating data and information to the second device 106 via the network 107. Some examples of the first device 104 may include a mobile phone, a smartphone, a tablet computer, a laptop computer, a desktop computer, a set-top box, or a connected device, etc. In at least one embodiment, the first device 104 includes a server. For example, the first device 104 may include a hardware server or another processor-based computing device configured to function as a server. The first device 104 may be configured to encrypt, decode and decrypt data.

The second device 106 may include a processor-based computing system. The second device 106 may include memory, a processor, and network communication capabilities. In the operating environment 100, the second device 106 may be capable of communicating data and information to the first device 104 via the network 107. Some examples of the second device 106 may include a mobile phone, a smartphone, a tablet computer, a laptop computer, a desktop computer, a set-top box, or a connected device, etc. In at least one embodiment, the second device 106 includes a server. For example, the second device 106 may include a hardware server or another processor-based computing device configured to function as a server. The second device 106 may be configured to process encrypted data without revealing or observing the actual data.

The network 107 may include a wired network, a wireless network, or any combination thereof. The network 107 may include any suitable configuration or configurations including a star configuration, token ring configuration, or other configurations. The network 107 may include a local area network (LAN), a wide area network (WAN) (e.g., the Internet), and/or other interconnected data paths across which multiple devices may communicate. In some embodiments, the network 107 may include a peer-to-peer network. The network 107 may also be coupled to or include portions of a telecommunications network that may enable communication of data in a variety of different communication protocols. In some embodiments, the network 107 includes BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, or the like.

The data storages 114 and 116 may each include any memory or data storage. The data storages 114 and 116 may each include network communication capabilities such that the environment components may communicate with the storages 114 and 116. In some embodiments, each of the storages 114 and 116 may include computer-readable storage media for carrying or having computer-executable instructions or data structures stored thereon. The computer-readable storage media may include any available media that may be accessed by a general-purpose or special-purpose computer, such as a processor. For example, each of the data storages 114 and 116 may include computer-readable storage media that may be tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may be included in each of the storages 114 and 116.

In the depicted embodiment, the data storages 114 and 116 are separate from the first device 104 and the second device 106. In some embodiments, the data storage 114 may be included in the first device 104 or the first device 104 may include a local data storage similar to the data storage 114 and may access the data storage 114 via the network 107. In some embodiments, the data storage 116 may be included in the second device 106 or the second device 106 may include a local data storage similar to the data storage 116 and may access the data storage 116 via the network 107.

The first device 104 may include an encryption manager 150. The encryption manager 150 may be configured to identify and encrypt a set of data. The encrypted data processing manager 155 may be configured to identify a set of data in plaintext format. The encrypted data processing manager 155 may create a secret key and store the secret key in the data storage 114. The encrypted data processing manager 155 may encrypt the set of data in plaintext format to ciphertext. The encrypted data processing manager 155 may send the ciphertext to the second device 106. The encryption manager 150 may be implemented using hardware including a processor, a microprocessor (e.g., to perform or control performance of one or more operations), an FPGA, or an ASIC. In some other instances, the encryption manager 150 may be implemented using a combination of hardware and software. Implementation in software may include rapid activation and deactivation of one or more transistors or transistor elements such as may be included in hardware of a computing system (e.g., the first device 104). Additionally, software defined instructions may operate on information within transistor elements. Implementation of software instructions may at least temporarily reconfigure electronic pathways and transform computing hardware.

The second device 106 may include an encrypted data processing manager 155. The encrypted data processing manager 155 may receive ciphertext from the first device 104. The encrypted data processing manager 155 may perform operations on underlying data without having a secret key. The operations may include, but are not limited to, addition, multiplication, or subtraction, division, etc. The encrypted data processing manager 155 may send the processed ciphertext to the first device 104. The encrypted data processing manager 155 may be implemented using hardware including a processor, a microprocessor (e.g., to perform or control performance of one or more operations), an FPGA, or an ASIC. In some other instances, the encrypted data processing manager 155 may be implemented using a combination of hardware and software. Implementation in software may include rapid activation and deactivation of one or more transistors or transistor elements such as may be included in hardware of a computing system (e.g., the second device 106). Additionally, software defined instructions may operate on information within transistor elements. Implementation of software instructions may at least temporarily reconfigure electronic pathways and transform computing hardware.

The first device 104 may also include a decryption manager 160. The decryption manager 160 may be configured to decode and recover the results of the operations performed by the encrypted data processing manager 155. The decryption manager 160 may be implemented using hardware including a processor, a microprocessor (e.g., to perform or control performance of one or more operations), an FPGA, or an ASIC. In some other instances, the decryption manager 160 may be implemented using a combination of hardware and software. Implementation in software may include rapid activation and deactivation of one or more transistors or transistor elements such as may be included in hardware of a computing system (e.g., the first device 104). Additionally, software defined instructions may operate on information within transistor elements. Implementation of software instructions may at least temporarily reconfigure electronic pathways and transform computing hardware.

The first device 104 may also include a data presentation manager 165. The data presentation manager 165 may be configured to present the results of the operations performed by the encrypted data processing manager 155. The data presentation manager 165 may present the results of the operations in a text-based and/or graphical format. In at least one embodiment, the data presentation manager 165 may send the results of the operations to a client device and optionally may send instructions for how the client device may present the results of the operations. In at least one embodiment, the data presentation manager 165 may perform further operations on the data, after the data has been decoded. The data presentation manager 165 may be implemented using hardware including a processor, a microprocessor (e.g., to perform or control performance of one or more operations), an FPGA, or an ASIC. In some other instances, the data presentation manager 165 may be implemented using a combination of hardware and software. Implementation in software may include rapid activation and deactivation of one or more transistors or transistor elements such as may be included in hardware of a computing system (e.g., the first device 104). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. Specifically, the operating environment may include one or more first devices 104, one or more second devices 106, one or more data storages 114, 116, or any combination thereof.

Moreover, the separation of various components in the embodiments described herein is not meant to indicate that the separation occurs in all embodiments. It may be understood with the benefit of this disclosure that the described environment components may be integrated together in a single component or separated into multiple components. For example, in some embodiments, the encrypted data processing manager 155 and/or one or more functionalities attributed thereto may be performed by a module on the first device 104. In such instances, the encrypted data processing manager 155 may be separated from other components of the first device 104.

Figure 2:
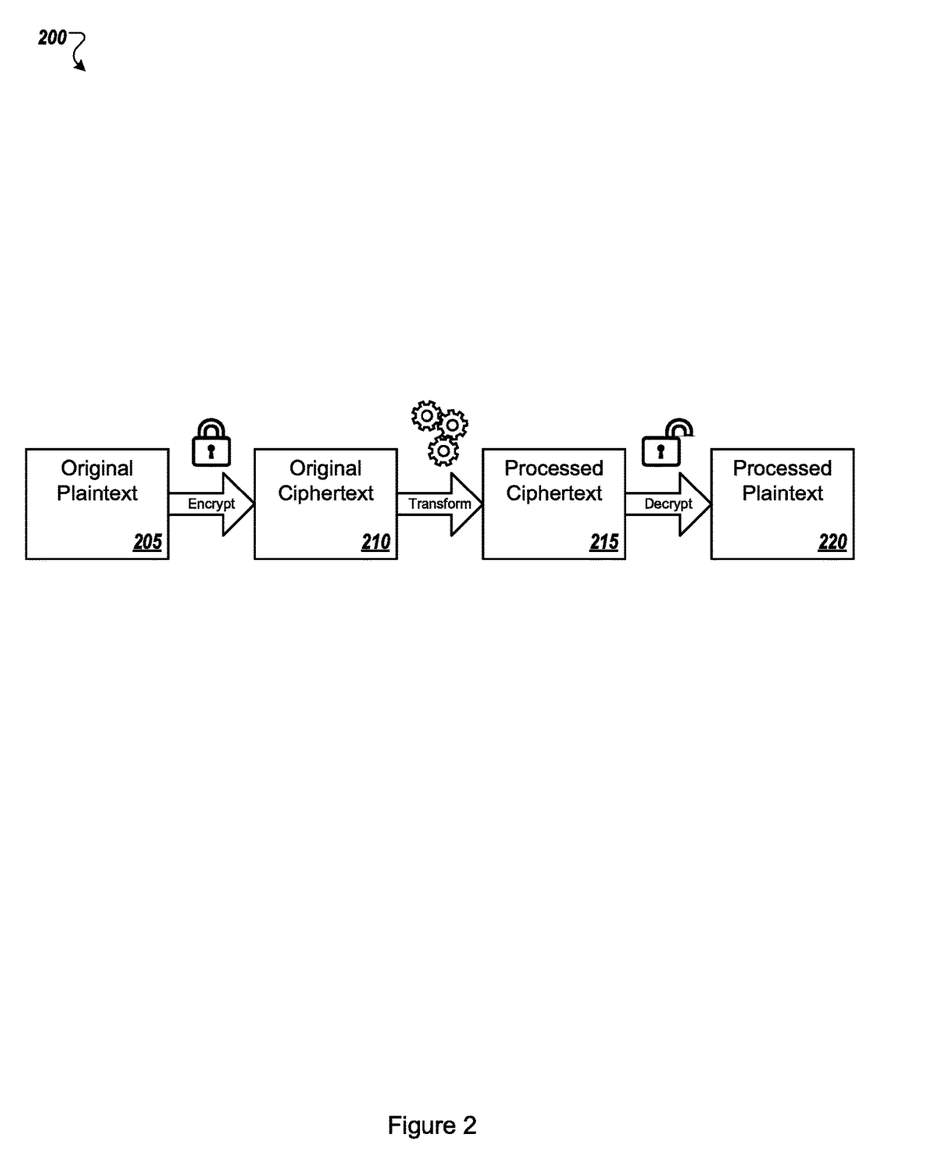
FIG. 2 illustrates an example data flow related to polynomial-based homomorphic encryption.

FIG. 2 illustrates an example data flow 200 related to polynomial-based homomorphic encryption. In at least one embodiment, the data flow 200 pertains to a flow of data among environment components, such as the environment components of FIG. 1.

A first device (e.g., the first device 104 of FIG. 1) may encrypt original plaintext 205 to create original ciphertext 210. The first device may create the original ciphertext 210 by encrypting the original plaintext 205 using polynomial-based HE. The first device may send the original ciphertext 210 to a second device (not illustrated in FIG. 2). The second device may transform the original ciphertext 210 to create processed ciphertext 215. The second device may perform various operations on the original ciphertext 210, such as addition, multiplication, subtraction, or division, etc. The second device may send the processed ciphertext 215 to the first device. The first device may decode the processed ciphertext 215 to processed plaintext 220.

FIGS. 3-6 illustrate flow diagrams of example methods related to polynomial-based homomorphic encryption. The methods may be performed by processing logic that may include hardware (circuitry, dedicated logic, etc.), software (such as is run on a general purpose computer system or a dedicated machine), or a combination of both, which processing logic may be included in the operating environment 100 of FIG. 1, or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

Figure 3:
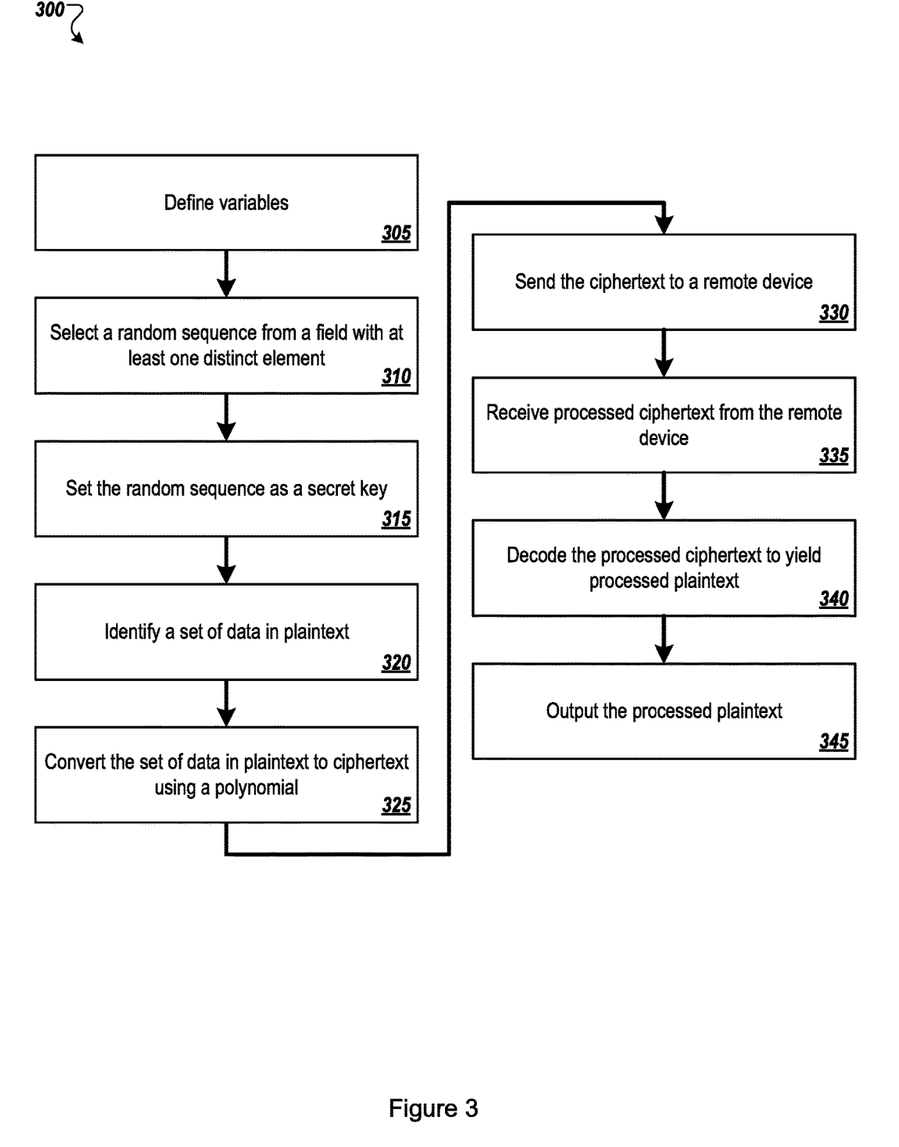
FIG. 3 illustrates a flow diagram of an example method to create and manage a homomorphic encryption scheme.

FIG. 3 illustrates a flow diagram of an example method 300 to create and manage a homomorphic encryption scheme. The method 300 may be performed, at least in part, by processing logic in a server, such as the server 140 of FIG. 1.

The method 300 may begin at block 305, where the processing logic may define variables for a polynomial-based homomorphic encryption scheme. The polynomial-based homomorphic encryption scheme may include one or more algorithms for generating a secret key, encrypting data, and decoding the data. Variables that may be included in the one or more algorithms may include message space defined by a field $\mathbb{F}_q$, where $\mathbb{F}_q$ is a finite field with a finite number of q elements. Operations, such as additions and multiplications, may be performed over the field $\mathbb{F}_q$. Additional variables may include a length n, a dimension k, and a distance d, which may be referred to as an "n, k, d code." The processing logic may define n, k, and d. For example, n may be defined by the expression: $n=2^{v_m}k+2(v_a+v_m+1)\delta+2<<q$, and $d=n-k+1$, $v=poly(\lambda)$, and $k=poly(\lambda)$. $\lambda$ may represent a security parameter and may imply that any attacker with $2^\lambda$ resources (in terms time and memory) may not successfully break the scheme. In at least one embodiment, $\lambda$ may be 80. The expression $poly(\lambda)$ may represent any polynomial in $\lambda$. In at least one embodiment, for n, a $v_a$ represents a maximum number of homomorphic addition operations that may be performed, and a $v_m$ represents a maximum number of homomorphic multiplication operations that may be performed.

At block 310, the processing logic may select a random sequence with at least one distinct element from the field $\mathbb{F}_q$. In at least one embodiment, a random sequence, $\langle sk_i \rangle_{i=1}^n$, is selected from the field $\mathbb{F}_q$. The sequence may include n numbers. At block 315, the processing logic may set the random sequence selected at block 310 as a secret key, as in the expression: $sk:=\langle sk_i \rangle_{i=1}^n$. The processing logic may store the secret key in a data storage. In at least one embodiment, the secret key may not be shared with other entities.

At block 320, the processing logic may identify a set of data in plaintext format. The set of data may include data that is to be manipulated or operated upon by a less secure entity. For example, the set of data may include potentially sensitive data (e.g., voting data, healthcare data, or other data that may be sensitive), where it may be advantageous to have operations performed on the set of data while maintaining secrecy or privacy of the set of data. In at least one embodiment, the processing logic may identify the set of data in response to a request from a user. For example, a system administrator may desire to process or perform operations on healthcare data. The system administrator may submit a request to process the healthcare data. The request may also identify which data to process. The set of data may be represented by a variable, m, and may be selected from the field $\mathbb{F}_q$. The variable m may also be represented by the expression: $m \in \mathbb{F}_q$.

At block 325, the processing logic may convert the set of data in plaintext to ciphertext using a random polynomial. In at least one embodiment, converting the data in plaintext to ciphertext may include encrypting the ciphertext based on the random polynomial, where the ciphertext includes the encrypted data. Some embodiments of converting the set of data in plaintext to ciphertext using the random polynomial are further described in conjunction with FIG. 4. At block 330, the processing logic may send the ciphertext to a remote device (e.g., the second device 106 of FIG. 1).

At block 335, the processing logic may receive processed ciphertext from the remote device. The ciphertext may have been processed by the remote device (e.g., the second device 106 of FIG. 1) according to the method of FIG. 6. At block 340, the processing logic may decode the processed ciphertext to yield processed plaintext. In at least one embodiment, the processing logic may decode the processed ciphertext according to the method of FIG. 5.

At block 345, the processing logic may output the processed plaintext. In at least one embodiment, outputting the processed plaintext may include storing the processed plaintext in a data storage. In at least one embodiment, outputting the processed plaintext may include presenting the processed plaintext in a graphical display or causing the processed plaintext to be presented on a display device. The presentation of the processed plaintext in the graphical display may include a graphical representation of the processed plaintext in text-based objects of graphical objects (e.g., graphs, tables), or a combination thereof.

Figure 4:
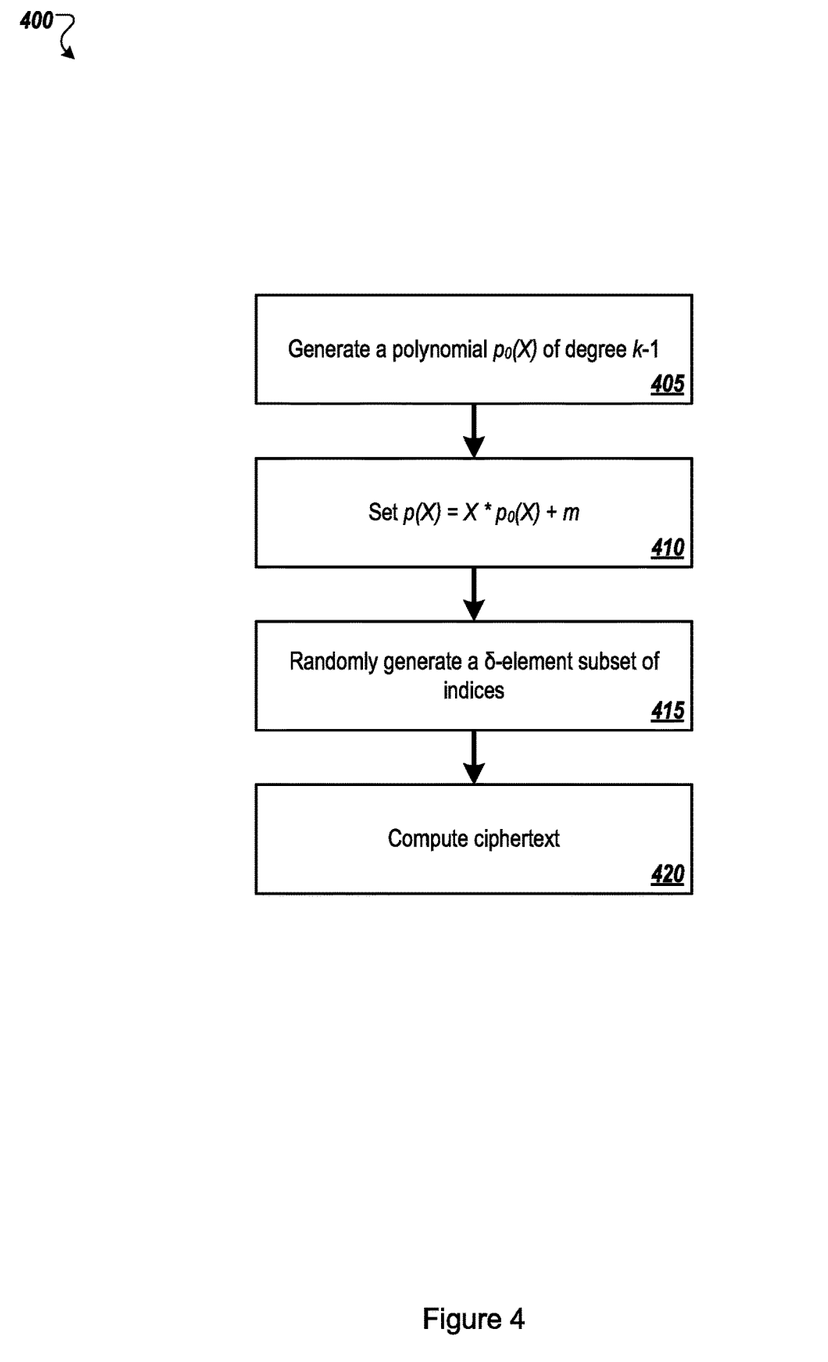
FIG. 4 illustrates a flow diagram of an example method to convert a set of data in plaintext to ciphertext using a random polynomial.

FIG. 4 illustrates a flow diagram of an example method 400 to convert a set of data in plaintext to ciphertext using a random polynomial. The method 400 may be performed, at least in part, by processing logic in an electronic device, such as the first device 104 of FIG. 1.

At block 405, the processing logic may generate a random polynomial. The random polynomial may be represented by the expression $p_0(X)$ and may be of degree k−1 in $\mathbb{F}_q[X]$. In at least one embodiment, X may be an indeterminate. A degree k−1 random polynomial may include $a_0 x^{k-1} + a_1 x^{k-2} + \ldots + a_{k-1}$, where $a_0, a_1, \ldots, a_{k-1}$ may be randomly selected from $\mathbb{F}_q$. At block 410, the processing logic may set the random polynomial $\mathbb{F}(X)=X$. $\mathbb{F}_0(X)+m$. At block 415, the processing logic may randomly generate a $\delta$ element subset of indices, which may be represented by the expression: $I \subset [1, n]$.

At block 420, the processing logic may compute ciphertext. In at least one embodiment, the ciphertext may be represented by the expression: $\langle c_i \rangle_{i=1}^n$. In at least one embodiment, the processing logic may compute the ciphertext based on the equation:

$$c_i := \begin{cases} p(sk_i), & \text{if } i \notin I \\ \text{Randomly sampled from } \mathbb{Z}_q, & \text{if } i \in I \end{cases}, \text{ where } p(sk_i)$$

is the random polynomial generated at block 405. In at least one embodiment, a security of the homomorphic encryption scheme may be based on a hidden set of polynomial evaluation x-coordinates and random addition of noise while encrypting. $\mathbb{Z}_q$ may include randomness and may include a set of numbers $\{0,1, \ldots, q-1\}$.

Figure 5:
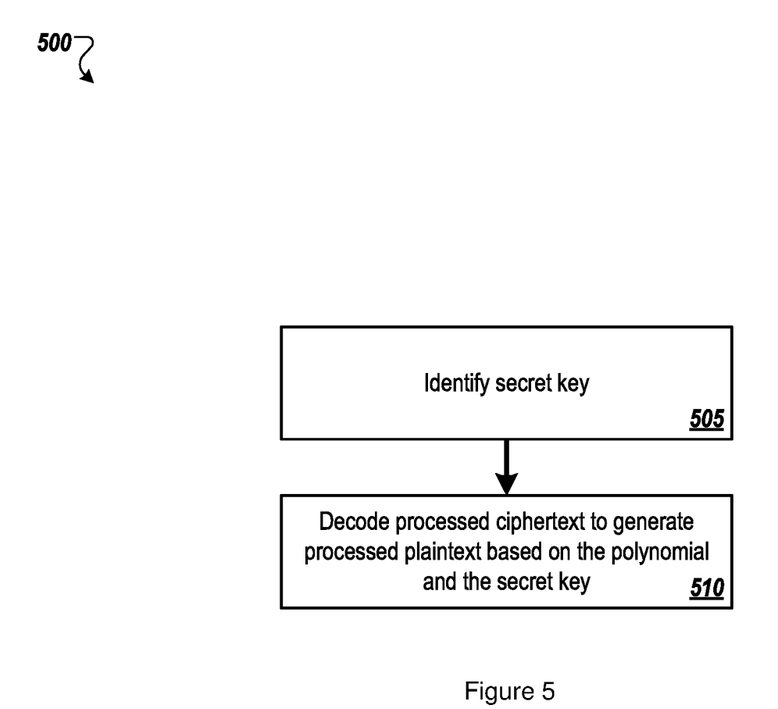
FIG. 5 illustrates a flow diagram of an example method to decode processed ciphertext.

FIG. 5 illustrates a flow diagram of an example method 500 to decode processed ciphertext. The method 500 may be performed in an operating environment such as the operating environment 100 of FIG. 1. The method 500 may be programmably performed in some embodiments by the first device 104 described with reference to FIG. 1. The first device 104 may include or may be communicatively coupled to a non-transitory computer-readable medium having stored thereon or encoded therein programming code or instructions that are executable by a processor to perform or cause performance of the method 500. Additionally or alternatively, the first device 104 may include a processor that is configured to execute computer instructions to perform or control performance of the method 500. Although illustrated as discrete blocks, various blocks may be divided into additional blocks, combined into fewer blocks, or eliminated, depending on the desired implementation.

The method 500 may begin at block 505, where the processing logic may identify a secret key. The secret key may include the secret key generated at block 315 of FIG. 3. The processing logic may access or retrieve the secret key from a data storage. In at least one embodiment, the secret key may be represented by the expression: $sk:=\langle sk_i \rangle_{i=1}^n$.

At block 510, the processing logic may decode processed ciphertext (e.g., ciphertext received at block 335 of FIG. 3). The processing logic may decode the processed ciphertext to generate a random polynomial. The processing logic may attempt to reproduce the random polynomial generated at block 405 of FIG. 4 using the processed ciphertext and the secret key. In at least one embodiment, the client device may use $[n, 2^{v_m}k+1]_q$ Reed-Solomon decoding techniques on n data points in the expression $\langle sk_i, c_i \rangle_{i-1}{}^n$ to decode the random polynomial.

Figure 6:
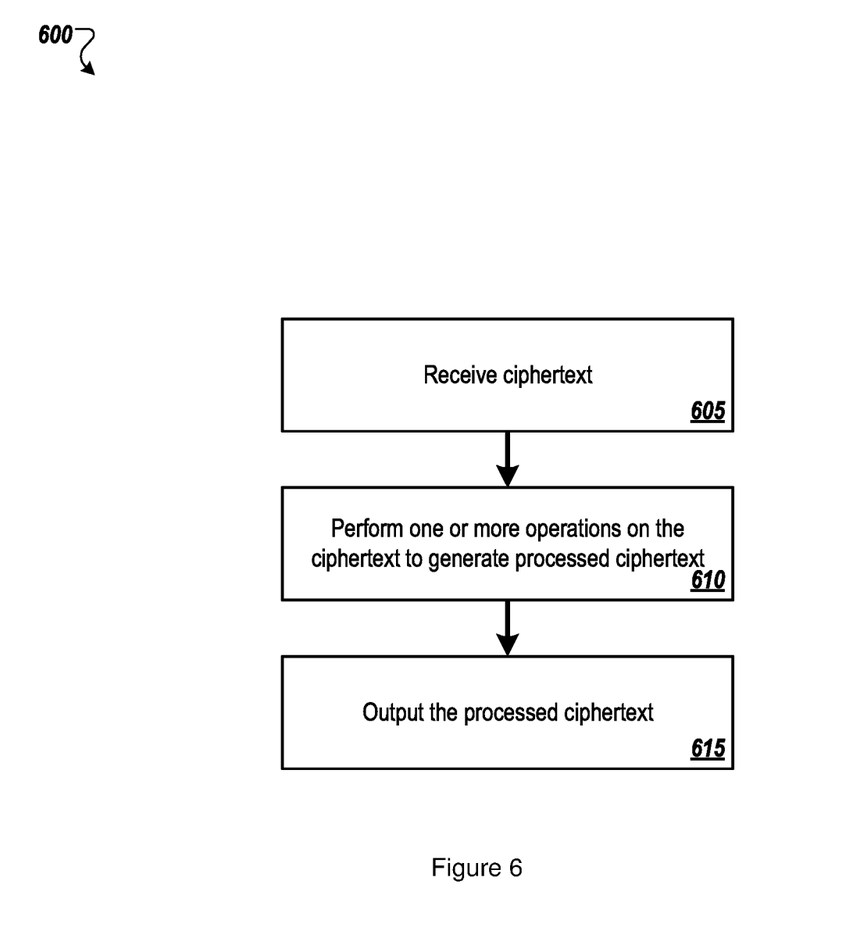
FIG. 6 illustrates a flow diagram of an example method to process ciphertext.

FIG. 6 illustrates a flow diagram of an example method 600 to process ciphertext. The method 600 may be performed in an operating environment such as the operating environment 100 of FIG. 1. The method 600 may be programmably performed in some embodiments by the second device 106 described with reference to FIG. 1. The second device 106 may include or may be communicatively coupled to a non-transitory computer-readable medium having stored thereon or encoded therein programming code or instructions that are executable by a processor to perform or cause performance of the method 600. Additionally or alternatively, the second device 106 may include a processor that is configured to execute computer instructions to perform or control performance of the method 600. Although illustrated as discrete blocks, various blocks may be divided into additional blocks, combined into fewer blocks, or eliminated, depending on the desired implementation.

The method 600 may begin at block 605, where the processing logic may receive ciphertext (e.g., original ciphertext). The ciphertext may be ciphertext sent by another device (e.g., the ciphertext of block 330 of FIG. 3). The ciphertext may be encrypted data, such that the processing logic is unable to read the encrypted data. In at least one embodiment, the processing logic may also receive instructions to perform one or more operations on the ciphertext. The processing logic may receive the instructions from the same device as the ciphertext or from a different device (e.g., from a device of a system administrator).

At block 610, the processing logic may perform one or more operations on the ciphertext. The operations may include homomorphic operations. In at least one embodiment, a threshold number of operations (e.g., d operations) may be performed on the ciphertext. In an example, a first ciphertext may be represented by the expression: $\langle c_i \rangle_{i-1}{}^n$, and a second ciphertext may be represented by the expression: $\langle c_i' \rangle_{i=1}{}^n$. A homomorphic addition operation may be represented as: $\langle c_i + c_i' \rangle_{i=1}{}^n$. Similarly, a homomorphic multiplication operation may be represented as: $\langle c_i \cdot c_i' \rangle_{i=1}{}^n$.

At block 615, the processing logic may output the processed ciphertext. In at least one embodiment, outputting the processed ciphertext may include sending the processed ciphertext to another device (e.g., the first device 104 of FIG. 1). In at least one embodiment, outputting the processed ciphertext may include storing the processed ciphertext in a data storage. The data storage may be accessible by another device (e.g., the first device 104 of FIG. 1).

Figure 7:
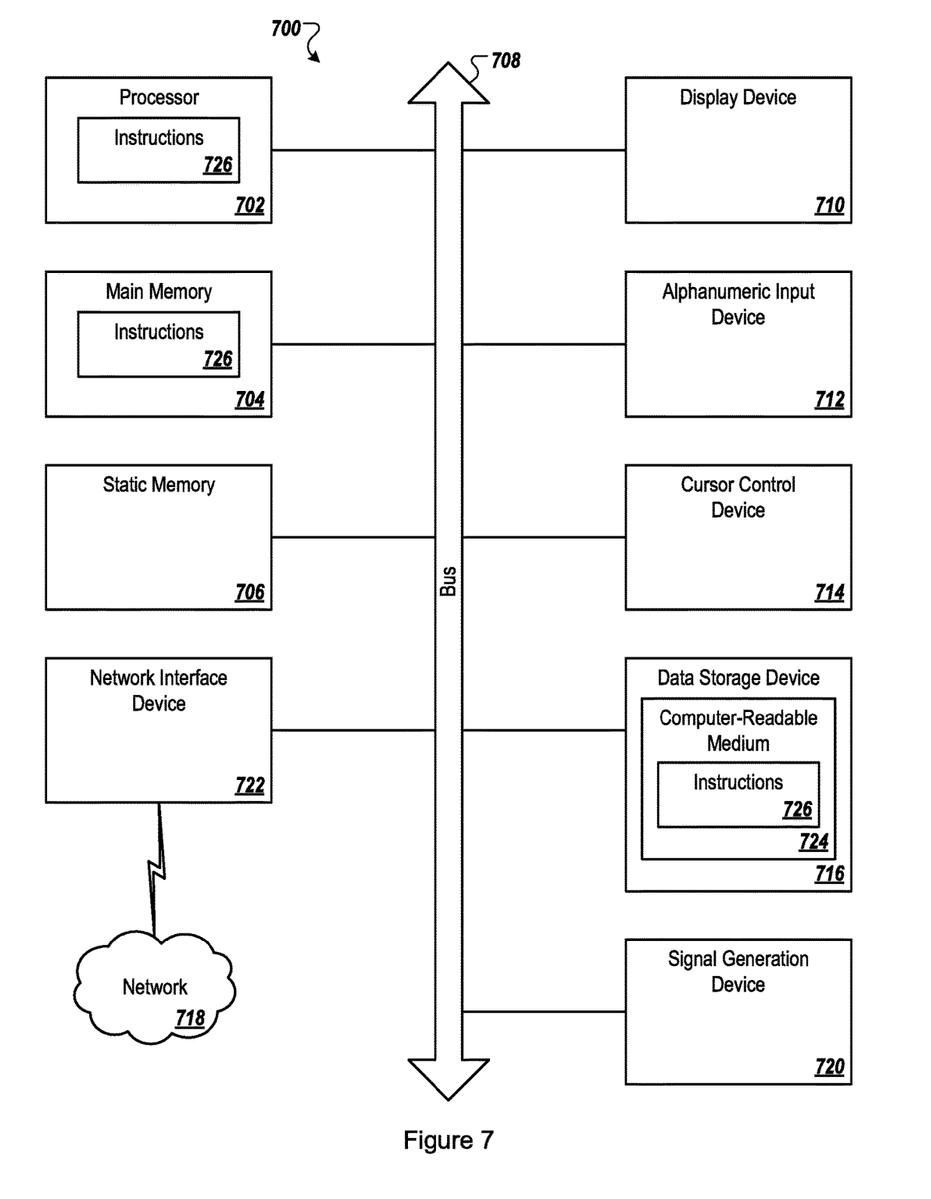
FIG. 7 illustrates a diagrammatic representation of a machine in the example form of a computing device within which a set of instructions, for causing the machine to perform any one or more of the methods discussed herein, may be executed, all arranged in accordance with at least one embodiment described herein.

FIG. 7 illustrates a diagrammatic representation of a machine in the example form of a computing device 700 within which a set of instructions, for causing the machine to perform any one or more of the methods discussed herein, may be executed. The computing device 700 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 700 includes a processing device (e.g., a processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)) and a data storage device 716, which communicate with each other via a bus 708.

Processing device 702 represents one or more general-purpose processing devices such as a microprocessor, central processing unit, or the like. More particularly, the processing device 702 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also include one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computing device 700 may further include a network interface device 722 which may communicate with a network 718. The computing device 700 also may include a display device 710 (e.g., a liquid crystal display (LCD) or a cathode ray tube (CRT)), an alphanumeric input device 712 (e.g., a keyboard), a cursor control device 714 (e.g., a mouse) and a signal generation device 720 (e.g., a speaker). In one implementation, the display device 710, the alphanumeric input device 712, and the cursor control device 714 may be combined into a single component or device (e.g., an LCD touch screen).

The data storage device 716 may include a computer-readable storage medium 724 on which is stored one or more sets of instructions 726 (e.g., system 100 of FIG. 1) embodying any one or more of the methods or functions described herein. The instructions 726 may also reside, completely or at least partially, within the main memory 704 and/or within the processing device 702 during execution thereof by the computing device 700, the main memory 704 and the processing device 702 also constituting computer-readable media. The instructions may further be transmitted or received over a network 718 via the network interface device 722.

While the computer-readable storage medium 726 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method, comprising:
identifying a field that includes a set of sequences;
generating a polynomial using the field, wherein the polynomial generated is based on a plurality of randomly selected sequences from the field;
generating a secret key for encryption and decoding data;
identifying a set of data stored in plaintext format;
converting, by a processing device, the set of data to ciphertext using a polynomial, a set of random noise, and the secret key, wherein the ciphertext is generated using the polynomial, the set of random noise and the secret key, wherein the secret key includes a random sequence from the set of sequences of the field with at least one distinct element;
sending the ciphertext to a remote device for data processing, wherein the remote device is to process the ciphertext without decoding the ciphertext;
receiving processed ciphertext from the remote device;
decoding, by the processing device, the processed ciphertext based on the secret key and the polynomial to yield processed plaintext; and
outputting the processed plaintext.

2. The method of claim 1, wherein the generating the secret key comprises:
selecting the random sequence from the set of sequences of the field; and
setting the random sequence as the secret key.

3. The method of claim 1, wherein the converting the set of data comprises
encrypting the set of data to create the ciphertext.

4. The method of claim 1, wherein the set of data is encrypted with a degree of randomness.

5. The method of claim 1, wherein the processed ciphertext is decoded using Reed-Solomon decoding techniques.

6. The method of claim 1, wherein the decoding comprises:
retrieving the secret key from a data storage; and
reproducing the polynomial using the processed ciphertext and the secret key.

7. The method of claim 1, wherein the outputting comprises displaying the processed plaintext on a display device.

8. A system, comprising;
a memory storing programmable code; and
a processor operatively coupled to the memory, the processor being configured to execute the programmable code to perform operations comprising:
identifying a field that includes a set of sequences;
generating a polynomial using the field, wherein the polynomial generated is based on a plurality of randomly selected sequences from the field;
generating a secret key for encryption and decoding data;
identifying a set of data stored in plaintext format;
converting the set of data to ciphertext using a polynomial, a set of random noise, and the secret key, wherein the ciphertext is generated using the polynomial, the set of random noise, and the secret key, wherein the secret key includes a random sequence from the set of sequences of the field with at least one distinct element;
sending the ciphertext to a remote device for data processing, wherein the remote device is to process the ciphertext without decoding the ciphertext;
receiving processed ciphertext from the remote device;

decoding the processed ciphertext based on the secret key and the polynomial to yield processed plaintext; and outputting the processed plaintext.

9. The system of claim 8, wherein the processor is further configured to, when generating the secret key, perform operations comprising:

selecting the random sequence from the set of sequences of the field; and setting the random sequence as the secret key.

10. The system of claim 8, wherein the processor is further configured to, when converting the set of data, perform operations comprising encrypting the set of data to create the ciphertext.

11. The system of claim 8, wherein the set of data is encrypted with a degree of randomness.

12. The system of claim 8, further comprising decoding the processed ciphertext using Reed-Solomon decoding techniques.

13. The system of claim 8, wherein the processor is further configured to, when decoding the processed ciphertext, perform operations comprising:

retrieving the secret key from a data storage; and reproducing the polynomial using the processed ciphertext and the secret key.

14. The system of claim 8, wherein the outputting comprises displaying the processed plaintext on a display device.

15. A non-transitory computer-readable medium having encoded therein programming code executable by a processor to perform or control performance of operations comprising:

identifying a field that includes a set of sequences;

generating a polynomial using the field, wherein the polynomial generated is based on a plurality of randomly selected sequences from the field;

generating a secret key for encryption and decoding data;

identifying a set of data stored in plaintext format;

converting the set of data to ciphertext using a polynomial, a set of random noise, and the secret key, wherein the ciphertext is generated using the polynomial, the set of random noise and the secret key, wherein the secret key includes a random sequence from the set of sequences of the field with at least one distinct element;

sending the ciphertext to a remote device for data processing, wherein the remote device is to process the ciphertext without decoding the ciphertext;

receiving processed ciphertext from the remote device;

decoding the processed ciphertext based on the secret key and the polynomial to yield processed plaintext; and outputting the processed plaintext.

16. The non-transitory computer-readable medium of claim 15, wherein the generating the secret key comprises:

selecting the random sequence from the set of sequences of the field; and setting the random sequence as the secret key.

17. The non-transitory computer-readable medium of claim 15, wherein the converting comprises encrypting the set of data to create the ciphertext.

18. The non-transitory computer-readable medium of claim 15, further comprising decoding the processed ciphertext using Reed-Solomon decoding techniques.

19. The non-transitory computer-readable medium of claim 15, wherein the decoding comprises;

retrieving the secret key from a data storage; and reproducing the polynomial using the processed ciphertext and the secret key.

20. The non-transitory computer-readable medium of claim 15, wherein the outputting comprises displaying the processed plaintext on a display device.

* * * * *